(12) United States Patent
Kawaguchi et al.

(10) Patent No.: US 6,731,026 B1
(45) Date of Patent: May 4, 2004

(54) ELECTRIC DISCHARGE MACHINING APPARATUS LINEAR MOTOR DRIVE

(75) Inventors: Tsuneo Kawaguchi, Tokyo (JP); Takashi Kanaya, Tokyo (JP); Toshihiro Enya, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/031,330

(22) PCT Filed: May 22, 2000

(86) PCT No.: PCT/JP00/03241
§ 371 (c)(1), (2), (4) Date: Jan. 18, 2002

(87) PCT Pub. No.: WO01/89751
PCT Pub. Date: Nov. 29, 2001

(51) Int. Cl.[7] ............................ H02K 41/00; B23H 1/02
(52) U.S. Cl. ..................................... 310/12; 219/69.11
(58) Field of Search ............................. 219/69.1, 69.2, 219/69.11; 310/12, 13, 14

(56) References Cited

U.S. PATENT DOCUMENTS

| | | | | |
|---|---|---|---|---|
| 4,797,526 | A | * | 1/1989 | Inoue ........................ 219/69.12 |
| 5,701,039 | A | * | 12/1997 | Parison et al. ................. 310/12 |
| 5,834,862 | A | * | 11/1998 | Hartzell, Jr. .................. 310/12 |
| 5,998,890 | A | * | 12/1999 | Sedgewick et al. ............ 310/12 |
| 6,114,781 | A | * | 9/2000 | Hazelton et al. ............... 310/12 |
| 6,323,567 | B1 | * | 11/2001 | Hazelton et al. ............... 310/12 |
| 6,469,406 | B1 | * | 10/2002 | Hwang et al. ................. 310/12 |

FOREIGN PATENT DOCUMENTS

| | | |
|---|---|---|
| JP | 5-104332 | 4/1993 |
| JP | Hei 8-192326 | 7/1996 |
| JP | Hei 8-290341 | 11/1996 |
| JP | Hei 8-309620 | 11/1996 |
| JP | Hei 8-309641 | 11/1996 |
| JP | Hei 8-318433 | 12/1996 |
| JP | 11-252863 | 9/1999 |

* cited by examiner

*Primary Examiner*—Tran Nguyen
*Assistant Examiner*—Judson H. Jones
(74) *Attorney, Agent, or Firm*—Sughrue Mion, PLLC

(57) ABSTRACT

In an electric discharge machining apparatus using linear motor drive in which a machining power supply unit supplies an inter-electrode space between an electrode (1) and a workpiece (2) with a machining power and the workpiece (2) is machined while the electrode (1) and the workpiece (2) are moved in relation to each other by means of a driving device (8, 9, 10) implemented by a linear motor, a magnet supporting plate (17) for supporting a magnet (16) which is on the secondary side of the linear motor; a base plate (18) formed with at least one hole portion (18a); a spacer (19) for holding the magnet supporting plate (17) and the base plate (18) while leaving a predetermined space therebetween; and a compressor, (23), a dryer (24), a lubricator (25) and a regulator (26) for injecting compressed gas (20) from the hole portion (18a) toward the magnet supporting plate (17) are provided. By making the compressed gas (20) into collision with the magnet supporting plate (17) as a collision jet, the heat conductivity increases, so that it is possible to cool the magnet (16) and the magnet supporting plate (17) efficiently with a simple configuration.

10 Claims, 5 Drawing Sheets

ELECTRIC DISCHARGE MACHINING APPARATUS LINEAR MOTOR DRIVE

TECHNICAL FIELD

The present invention relates to an improvement in an electric discharge machining apparatus using linear motor drive which supplies a machining power to in a space between an electrode and a workpiece to cause an electric discharge, w and allows the electrode and the workpiece to relatively move by means of a linear motor, thereby machining the workpiece into a desired shape.

BACKGROUND ART

FIG. 4 is a configuration view of a conventional electric discharge machining apparatus using linear motor drive- which is disclosed in Japanese Patent Application Laid-open Publication No. 8-309620. In this drawing, the reference numeral 1 denotes an electrode, the reference numeral 2 denotes a workpiece, the reference numeral 3 denotes a spindle head, the reference numeral 4 denotes a chuck, the reference numeral 5 denotes a head, the reference numeral 6 denotes a machining tank, the reference numeral 7 denotes a machining liquid, the reference numeral 8 denotes an X-axis driving linear motor, the reference numeral 9 denotes a Y-axis driving linear motor, and the reference numeral 10 denotes a Z-axis driving linear motor. The electrode 1 is held by the chuck 4 which is connected with the spindle head 3. Further, the workpiece 2 is fixed in the machining tank 6 and dipped in the machining liquid 7. The X-axis driving linear motor 8, the Y-axis driving linear motor 9 and the Z-axis driving linear motor 10 constitutes a driving device which drives the respective axes to cause the electrode 1 and the workpiece 2 move in relation to each other. Additionally, a moving part and a fixed part of each axis driven by the X-axis driving linear motor 8, the Y-axis driving linear motor 9 and the Z-axis driving linear motor 10 are linearly supported by a linear guiding mechanism (not shown) so as to allow relative movement.

The electric discharge machining apparatus using linear motor drive is such that in an electric discharge machining apparatus which supplies an inter-electrode space between the electrode 1 and the workpiece 2 with a machining power by means of a machining power supply unit (not shown), and carries out electric discharge machining on the workpiece 2 to make it into a desired shape, while allowing relative movement of the electrode 1 and the workpiece 2 by means of a driving device, as shown in FIG. 4, a direct driving system by the X-axis driving linear motor 8, the Y-axis driving linear motor 9 and the Z-axis driving linear motor 10 as shown in FIG. 4 is employed.

Such an electric discharge machining apparatus using linear motor drive provides higher positioning accuracy in comparison with those of the type that employs a driving device which involves rotation/longitudinal motion conversion for converting a rotation output of a servo motor to a longitudinal motion by means of a ball screw, because an error such as lead error of ball screw can be eliminated. Furthermore, since there is no power transmission element for carrying out conversion of rotation/longitudinal motion, backlash is eliminated as well as the rigidity is improved, which improves the positioning accuracy and the quick responsibility. Therefore, the electric discharge machining apparatus using linear motor drive can realize high speed and high accuracy electric discharge machining.

FIG. 5 is an explanatory view showing a configuration of a linear motor used in a conventional electric discharge machining apparatus using linear motor drive. In the drawing, the reference numeral 11 denotes a moving part, the reference numeral 12 denotes a fixed part, the reference numeral 13 denotes an iron core, the reference numeral 14 denotes a coil, the reference numeral 15 denotes cooling piping, the reference numeral 16 denotes a magnet, the reference numeral 17 denotes a magnet supporting plate and the reference numeral 18 denotes abase plate, and the moving part 1 which is on the primary side of the linear motor and the fixed part 2 which is on the secondary side of the linear motor are supported by a linear guiding mechanism (not shown) so that they can linearly move in relation to each other. Since the heat generated by the coil 14 can efficiently be cooled by forming the cooling piping in the iron core 13, it is possible to improve the rated characteristics. The configuration described above is disclosed in U.S. Pat. No. 4,839,545, for example.

Because of heat conduction and heat transfer due to heat generation of the driving device of the electric discharge machining apparatus, thermal expansion and thermal distortion will occur in the mechanical structure of the electric discharge machining apparatus. Since machining accuracy on the order of $\mu$m is requested for an electric discharge machining apparatus, it is necessary to control these thermal expansion and thermal distortion.

In the conventional electric discharge machining apparatus using linear motor drive having the configurations illustrated in FIGS. 4 and 5, the moving part 11 which is on the primary side of the linear motor is cooled for the purpose of improving rated characteristics of the linear motor, while on the contrary, the fixed part 12 which is on the secondary side of the linear motor is not cooled. In such a conventional electric discharge machining apparatus using linear motor drive, thermal expansion and thermal distortion will occur in the fixed part 12 because of heat transfer from the moving part 11 to the fixed part 12 and dielectric loss of the magnet 16. Therefore, in the electric discharge machining apparatus using linear motor drive in which machining operation proceeds as the electrode 1 and the workpiece 2 move in relation to each other by means of the X-axis driving linear motor 8, the Y-axis driving linear motor 9 and the Z-axis driving linear motor 10 and in which high machining accuracy on the order of $\mu$m is requested, the relative positional accuracy of the electrode 1 and the workpiece 2 is deteriorated, which leads the first problem that the machining accuracy of the workpiece 2 decreases.

An electric discharge machining apparatus is often installed in the vicinity of a graphite working machine for machining a graphite electrode, a machining center for performing pre-working on a workpiece and the like, so that usually a lot of dust exists in the vicinity of the electric discharge machining apparatus. Furthermore, volatilization of machining liquid of the electric discharge machining apparatus also occurs.

Moreover, it is difficult to seal the driving parts of the linear motor because they move in the longitudinal direction, and also it is difficult to seal the linear guiding mechanism which supports between the moving part 11 and the fixed part 12 of the linear motor.

Therefore, in the conventional electric discharge machining apparatus using linear motor drive, there arises a second problem that the fixed part 12, the magnet 16 and the moving part 11 of the linear motor get damaged because of the above mentioned dust and volatilization of machining liquid.

DISCLOSURE OF THE INVENTION

The present invention was devised for solving the above mentioned problems. It is an object of the present invention to provide an electric discharge machining apparatus using linear motor drive capable of efficiently conducting cooling operation for preventing thermal expansion and thermal distortion of a mechanical structure due to a rise in temperature of driving parts of linear motor.

It is an another object of this invention to provide an electric discharge machining apparatus using linear motor drive capable of efficiently protecting the driving parts and the like of linear motor from dust.

An electric discharge machining apparatus using linear motor drive according to the present invention is an electric discharge machining apparatus using linear motor drive in which a machining power supply unit supplies a machining power in a space between an electrode and a workpiece and the workpiece is machined while the electrode and the workpiece are moved in relation to each other by means of a driving device implemented by a linear motor. There is provided a cooling device for cooling at least one of a magnet and a magnet supporting plate which supports the magnet which are on the secondary side of the linear motor.

Also, an electric discharge machining apparatus using linear motor drive according to the present invention is an electric discharge machining apparatus using linear motor drive in which a machining power supply unit supplies a machining power in a space between an electrode and a workpiece and the workpiece is machined while the electrode and the workpiece are moved in relation to each other by means of a driving device implemented by a linear motor. There is provided a magnet supporting plate for supporting a magnet which is on the secondary side of the linear motor, a base plate formed with at least one hole portion, a spacer for holding the magnet supporting plate and the base plate while leaving a predetermined space therebetween; and a cooling device for injecting compressed gas from the hole portion of the base plate toward the magnet supporting plate.

Moreover, the magnet supporting plate is formed with a cooling fin.

Furthermore, a dust cover is provided around the driving device configured by the linear motor.

The present invention, which is configured as described above, provides-the following advantage.

The electric discharge machining apparatus using linear motor drive according to the present invention provides an advantage that it is possible to obtain a high-performance and high-accuracy electric discharge machining apparatus using linear motor drive capable of efficiently performing cooling operation for suppressing thermal expansion and thermal distortion of the mechanical structure due to a rise in temperature of the driving parts of linear motor.

Also such an advantage is provided that it is possible to obtain a high-reliability electric discharge machining apparatus using linear motor drive capable of efficiently preventing the driving parts and the like of linear motor from dust.

Also such an advantage is provided that it is possible to achieve the above advantages while suppressing increase of the cost with simple structure.

BEST MODE FOR CARRYING OUT THE INVENTION

First Embodiment

Figure 1:
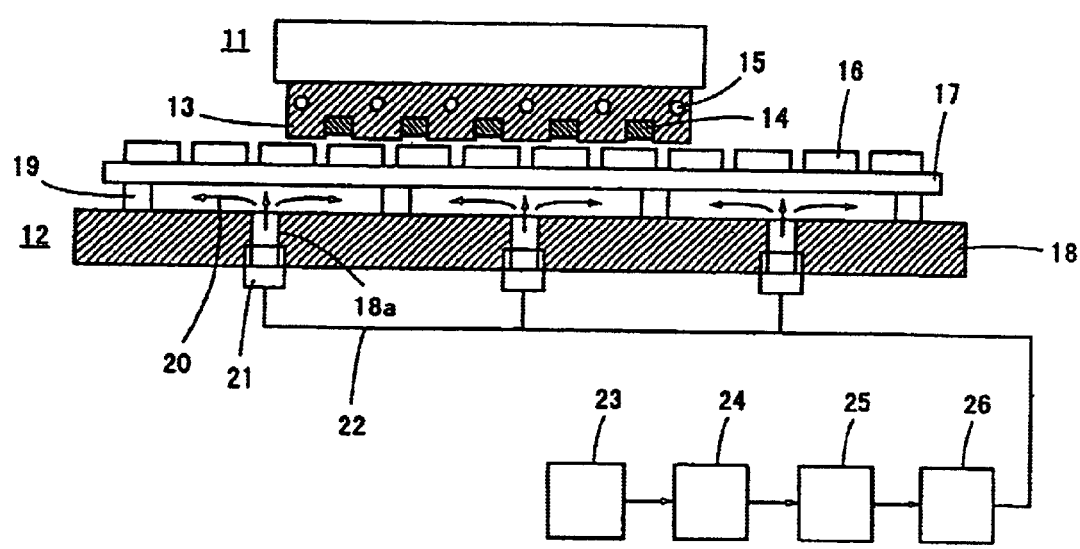
FIG. 1 is an explanatory view showing a configuration of a linear motor in an electric discharge machining apparatus using linear motor drive according to the first embodiment of the present invention.
Figure 4:
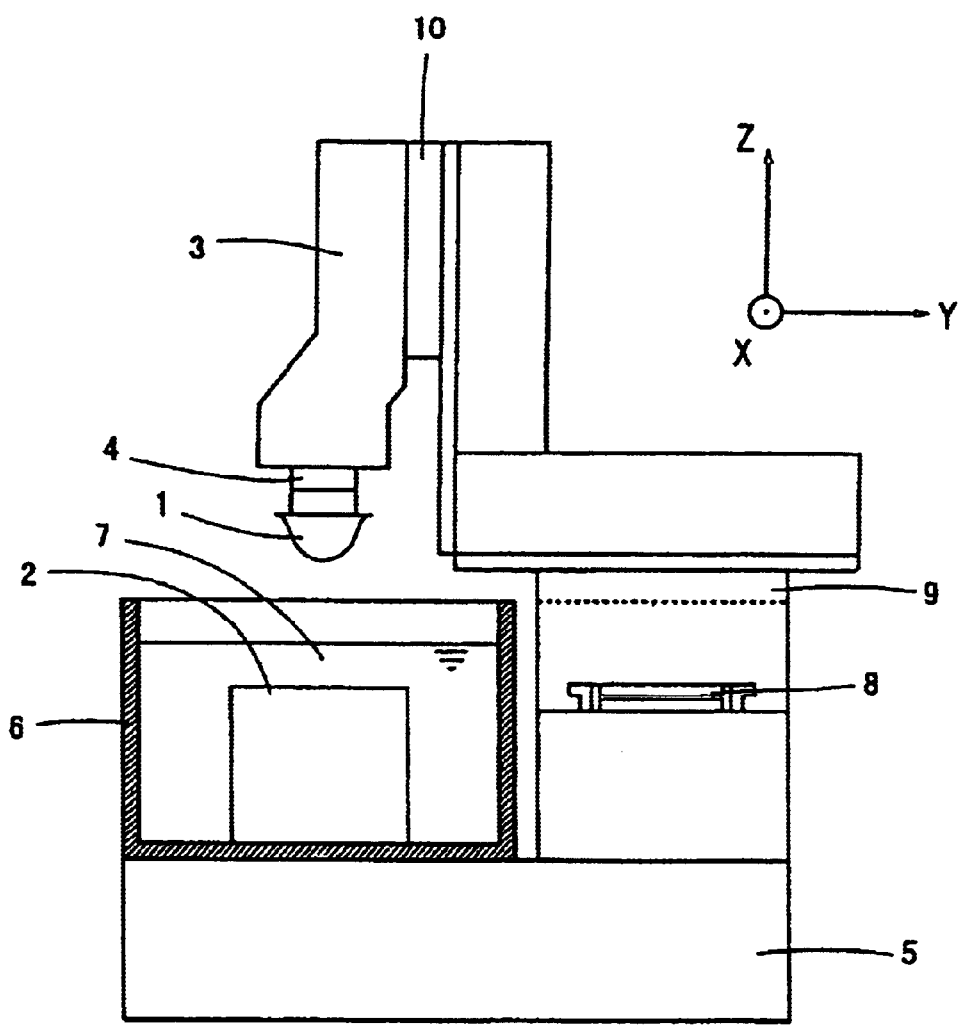
FIG. 4 is a configuration view of an electric discharge machining apparatus using linear motor drive.

A general configuration of an electric discharge machining apparatus using linear motor drive according to the present invention is similar to that of the prior art shown in FIG. 4. FIG. 1 is an explanatory view showing a configuration of a linear motor in an electric discharge machining apparatus using linear motor drive according to the first embodiment of the present invention. In FIG. 1, the reference numeral 11 denotes a moving part, the reference numeral 12 denotes a fixed part, the reference numeral 13 denotes an iron core, the reference numeral 14 denotes a coil, the reference numeral 15 denotes cooling piping, the reference numeral 16 denotes a magnet, the reference numeral 17 denotes a magnet supporting plate, the reference numeral 18 denotes a base plate, the reference numeral 19 denotes a spacer, the reference numeral 20 denotes a compressed gas such as air and nitrogen gas, the reference numeral 21 denotes a coupler, the reference numeral 22 denotes piping such as an air tube, the reference numeral 23 denotes a compressor, the reference numeral 24 denotes a dryer for removing moisture of compressed gas from the compressor 23 to give dry gas, the reference numeral 25 denotes a lubricator which controls lubrication of pneumatic appliances and the reference numeral 26 denotes a regulator for adjusting and controlling the pressure of the compressed gas delivered from the compressor 23, and the coupler 21, the piping 22, the compressor 23, the dryer 24, the lubricator 25 and the regulator 26 correspond to a cooling device for cooling the magnet 16, the magnet supporting plate 17 and the like which are on the secondary side of the linear motor. Furthermore, the moving part 11 which is on the primary side of the linear motor and the fixed part 12 which is on the secondary side are supported by a linear guiding mechanism (not shown) so as to leave a space of, e.g., about 0.5 mm therebetween and so as to be linearly movable in relation to each other.

Figure 5:
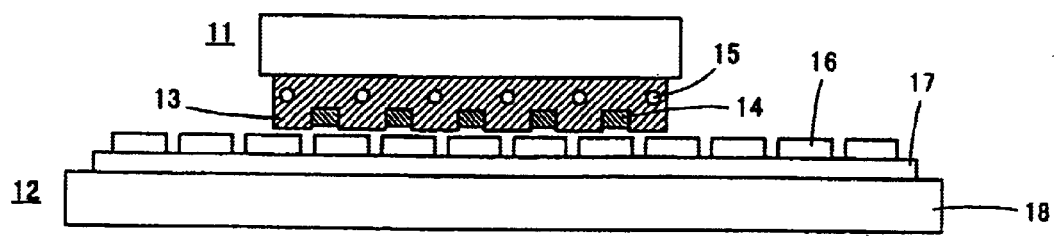
FIG. 5 is an explanatory view showing a configuration of linear motor used in a conventional electric discharge machining apparatus using linear motor drive.

In FIG. 1, the same or corresponding parts as those of FIG. 5 showing the prior art are denoted by the same reference numerals. Furthermore, configuration of the moving part 11 is as same as the configuration of FIG. 5, while configuration of the fixed part 12 is different from the configuration of FIG. 5. The magnet 16 is fixed to the magnet supporting plate 17 by, for example, adhesion, and the magnet supporting plate 17 is connected to the base plate 18 via the spacer 19 while leaving a space of, for example, about 5 mm to 10 mm there between. The base plate 18 is drilled with a hole portion 18a to which the coupler 21 and the piping 22 are connected for supplying the compressed gas 20 from the compressor 23, the dryer 24, the lubricator 25 and the regulator 26. After colliding with the magnet supporting plate 17 as a collision jet, the compressed gas 20 moves through the space between the magnet supporting plate 17 and the base plate 18.

In this way, by making the compressed gas 20 collide with the magnet supporting plate 17 in the form of a collision jet, heat conductivity is increased, so that it is possible to cool the secondary side of the linear more efficiently.

In the configuration shown in FIG. 1, the space between the magnet supporting plate 17 and the base plate 18, the diameter and the number of hole portion 18a formed in the base plate, the flow rate of the compressed gas supplied from the hole portion 18a and the like can be determined in accordance with the calorific value to be cooled, for example, by experiments.

The electric discharge machining apparatus has appliances such as the compressor 23, the dryer 24, the lubricator 25 and the regulator 26 because it is necessary to supply the chuck 4 which is connected with the spindle head 3 and an air cylinder or the like for ascending/descending the machining tank 6 with the compressed gas. Therefore, in the electric discharge machining apparatus using linear motor drive according to the present invention, it is not necessary to newly provide the appliances such as the compressor 23, the dryer 24, the lubricator 25 and the regulator 26 constituting the cooling device for the purpose of cooling the secondary side of the linear motor, so that it is possible to cool the secondary side of the linear motor with simple configuration while preventing the cost from rising due to installation of another set of appliances.

In the above description, explanation is given for the case where the spacer 19 is interposed between the magnet supporting plate 17 and the base plate 18, thereby connecting and holding the magnet supporting plate 17-and the base plate 18 while leaving a predetermined space therebetween, however, the spacer 19 may be any form insofar as it can hold the magnet supporting 17 and the base plate 18 at a predetermined space.

Furthermore, in the above description, explanation is given for the case where the moving part is implemented by a coil or the like and the fixer part is implemented by a magnet or the like, however, since the moving part and the fixed part move in relation to each other, it is also possible to regard the part implemented by a coil or the like as the fixed part, while regarding the part implemented by a magnet or the like as the moving part. In such a case, the present invention performs cooling of the moving part.

Second Embodiment

Figure 2:
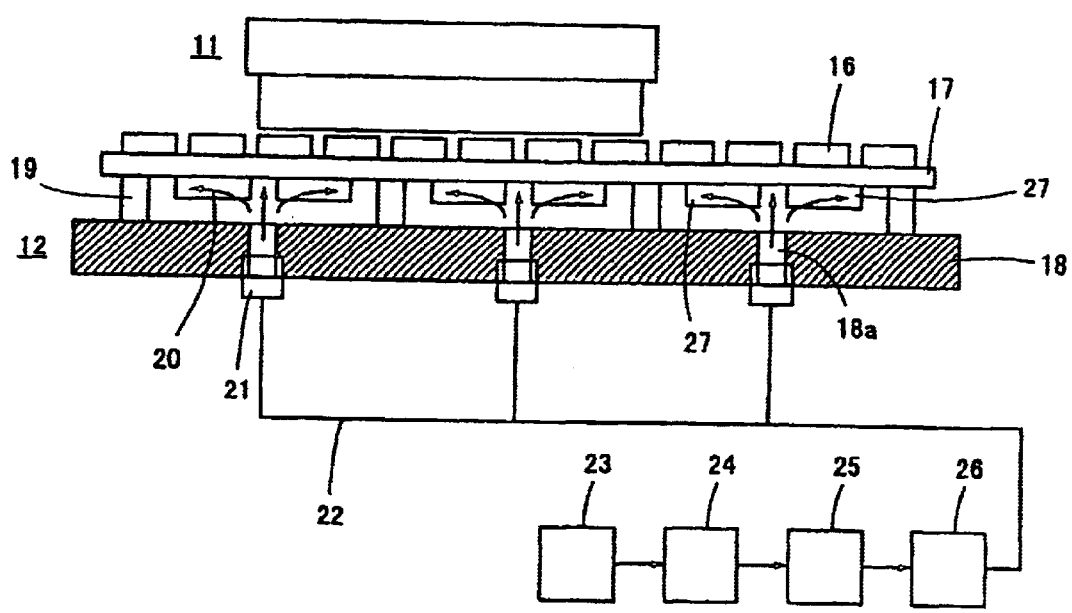
FIG. 2 is an explanatory view showing a configuration of a linear motor in an electric discharge machining apparatus using linear motor drive according to the second embodiment of the present invention.

FIG. 2 is an explanatory view showing a configuration of a linear motor in an electric discharge machining apparatus using linear motor drive according to the second embodiment of the present invention, in which the same or corresponding parts as those in FIG. 1 showing the first embodiment are denoted by the same reference numerals. In FIG. 2, the reference numeral 27 denotes a cooling fin, which is formed integrally with the magnet supporting plate 17 or fixed to the magnet supporting plate 17. After colliding with the magnet supporting plate 17 as a collision jet, the compressed gas 20 supplied from the compressor 23, the dryer 24, the lubricator 25 and the regulator 26 moves around the cooling fin 27 through the space between the magnet supporting plate 17 and the base plate 18.

By adopting the above configuration providing the cooling fin 27, the surface area which is cooled by the compressed gas 20 to radiate the heat is enlarged, so that it is possible to achieve more efficient cooling.

Furthermore, if the cooling fin 27 is not formed integrally with the magnet supporting plate 17, but formed as a separate part and fixed to the magnet supporting plate 17, it is possible to improve the cooling efficiency by interposing, for example, a heat conductive grease, at the junction between the cooling fin 27 and the magnet supporting plate 17.

Third Embodiment

Figure 3:
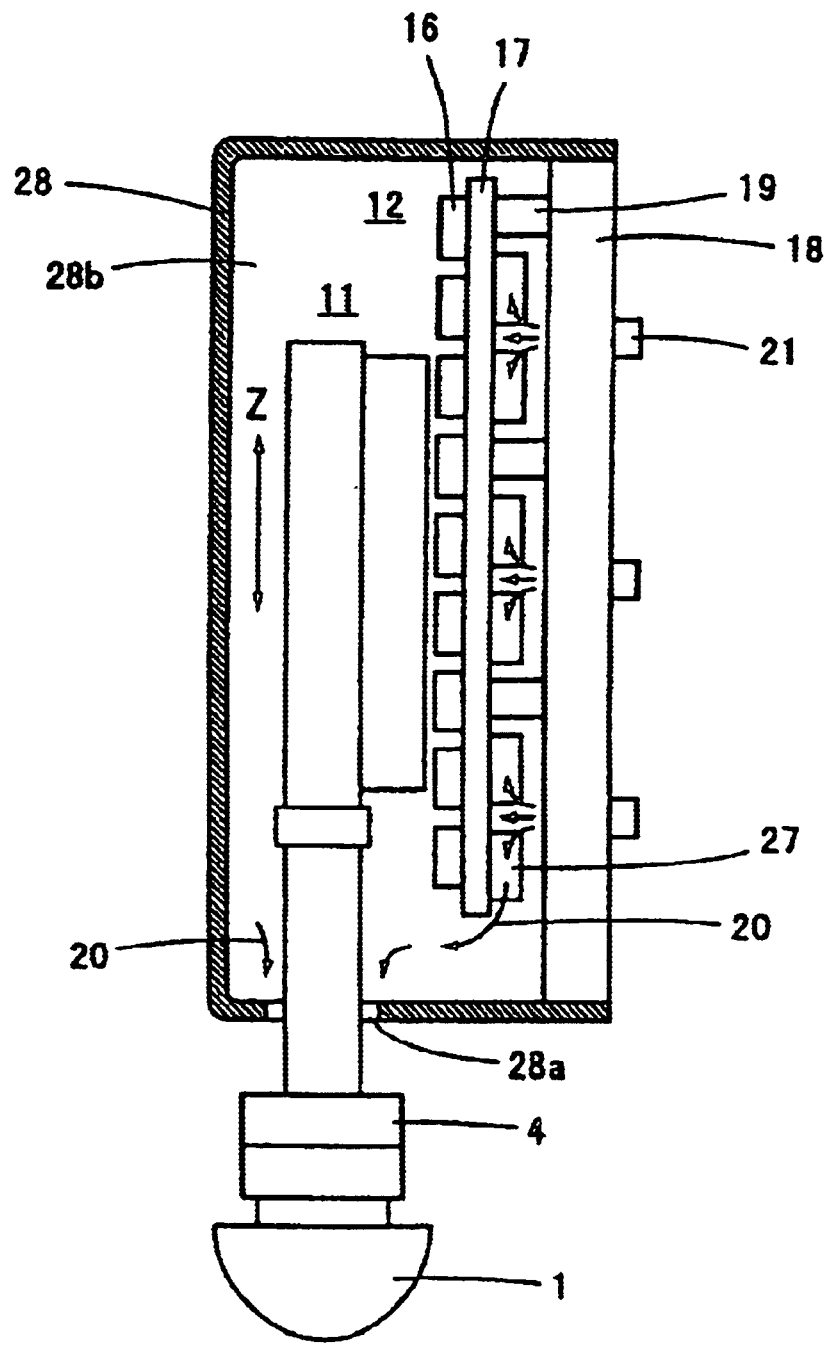
FIG. 3 is an explanatory view showing a configuration of proximity of a linear motor in an electric discharge machining apparatus using linear motor drive according to the third embodiment of the present invention.

FIG. 3 is an explanatory view showing a configuration of proximity of a linear motor in an electric discharge machining apparatus using linear motor drive according to the third embodiment of the present invention, and shows an example of configuration in the vicinity of the Z-axis for driving the spindle head 3. In FIG. 3, the same reference numerals as in FIG. 1 showing the first embodiment and in FIG. 2 showing the second embodiment represent the same for corresponding parts, and the reference numeral 28 denotes a dust cover, the reference numeral 28a denotes an opening of the dust cover 28, and the reference numeral 28b denotes an inside space of the dust cover 28.

Similarly to the second embodiment, the compressed gas 20 moves around the cooling fin 27 through the space between the magnet supporting plate 17 and the base plate 18 after colliding with the magnet supporting plate 17 as a collision jet.

Furthermore, since the opening 28a of the dust cover 28 is formed as small as possible, and the compressed gas 20 is supplied inside the dust cover 28, the inside space 28b of the dust cover 28 is at a positive pressure, so that it is possible to prevent dust or the like from entering through the opening 28a.

Accordingly, it is possible to prevent the magnet 16 of the fixed part 12, the moving part 11, the linear guiding mechanism and the like of the linear motor from being damaged by the entry of dust and the like.

Furthermore, by orienting the cooling fin 27 to the direction of the opening 28a, and forming the flow of the compressed gas 20 toward the opening 28a, it is possible to further improve the dust preventing efficiency.

As described above, the electric discharge machining apparatus using linear motor drive according to the third embodiment of the present invention can effectively protect the cooling and driving parts on the secondary side of the linear motor from dust with simple configuration by combining the pressure rise owing to a jet of the cooling compressed gas 20 and the dust cover 28 around the driving device.

Furthermore, since the compressed gas 20 is dried by the dryer 24, in the case where compressed air is used as the compressed gas 20, for example, there remains little water vapor in the inside space 28b of the dust cover 28, so that also protecting effects such as rust proofing of the appliances inside the dust cover 28 can be achieved.

When the dust cover 28 is provided, it is necessary to conduct particularly effective cooling because the temperature inside the dust cover 28 is likely to rise, and this can be achieved by increasing the number of hole portion 18a formed in the base plate 18, for supplying the compressed gas 20, by increasing the flow rate of the compressed gas, and by increasing the number and the surface area of the cooling fin 27.

In the above description, explanation is given while taking a profiling electric discharge machining apparatus as an example, however, the same effect is achieved when the present invention is applied to a wire electric discharge machining apparatus.

Industrial Applicability

As described above, the electric discharge machining apparatus using linear motor drive according to the present invention is suitably used in electric discharge machining operation.

What is claimed is:

1. An electric discharge machining apparatus using linear motor drive in which a machining power supply unit supplies a machining power in a space between an electrode and a workpiece and the workpiece is machined while the electrode and the workpiece are moved in relation to each other by means of a driving device implemented by a linear motor, wherein the electric discharge machining apparatus using linear motor drive comprises:

a magnet supporting plate for supporting a magnet which is on the secondary side of the linear motor;

a base plate formed with at least one hole portion;

a spacer for holding the magnet supporting plate and the base plate while leaving a predetermined space therebetween; and a cooling device for injecting compressed gas from the hole portion of the base plate toward the magnet supporting plate.

2. The electric discharge machining apparatus according to claim 1, wherein the magnet supporting plate is formed with a cooling fin.

3. The electric discharge machining apparatus according to claim 1, wherein a dust cover is provided around the driving device configured by the linear motor.

4. The electric discharge machining apparatus according to claim 1, further comprising:

a compressor for providing compressed gas; and a dryer for removing moisture from the compressed gas provided by the compressor.

5. The electric discharge machining apparatus according to claim 4, further comprising a regulator for controlling the pressure of the compressed gas.

6. The electric discharge machining apparatus according to claim 2, further comprising a heat conductive grease interposed between the magnet supporting plate and the cooling fin.

7. The electric discharge machining apparatus according to claim 3, wherein the inside of the dust cover is maintained at a positive pressure.

8. The electric discharge machining apparatus according to claim 1, wherein the magnet and the magnet supporting plate are in contact with one another.

9. The electric discharge machining apparatus according to claim 1, wherein base plate and the magnet supporting plate are disposed so as to be parallel to one another.

10. An electric machining apparatus using a linear motor drive in which a machining power supply unit supplies a machining power in a space between an electrode and a workpiece and the workpiece is machined while the electrode and the workpiece are moved in relation to each other by means of a driving device implemented by a liner motor, the electric discharge machining apparatus comprising;

a moving part which is on a primary side of the linear motor and which has a first magnet;

a magnet supporting plate which is on a secondary side of the linear motor and on which a second magnet is supported, wherein the moving part moves by interaction between the first and second magnets;

a base plate formed with at least one hole portion;

a spacer for holding the magnet supporting plate and the base plate while leaving a predetermined space therebetween; and a cooling device for injecting compressed gas from the hole portion of the base plate toward the magnet supporting plate.

* * * * *